June 17, 1941.　　T. PAUSCHERT　　2,245,871
FOCAL PLANE SHUTTER
Filed May 16, 1939　　2 Sheets-Sheet 1
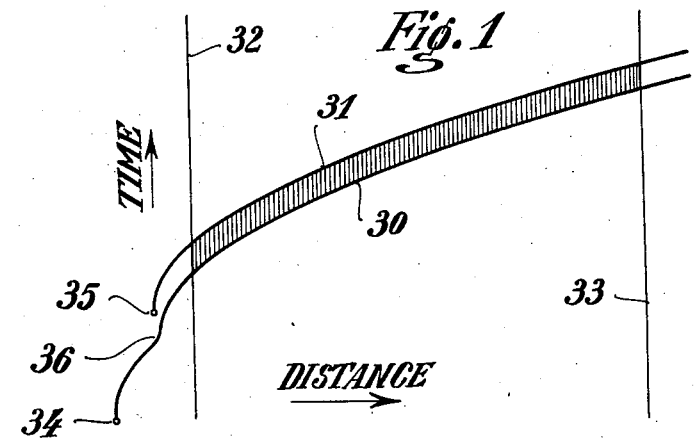
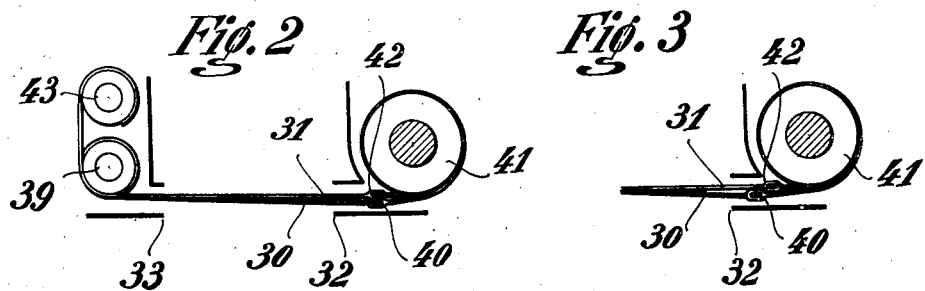
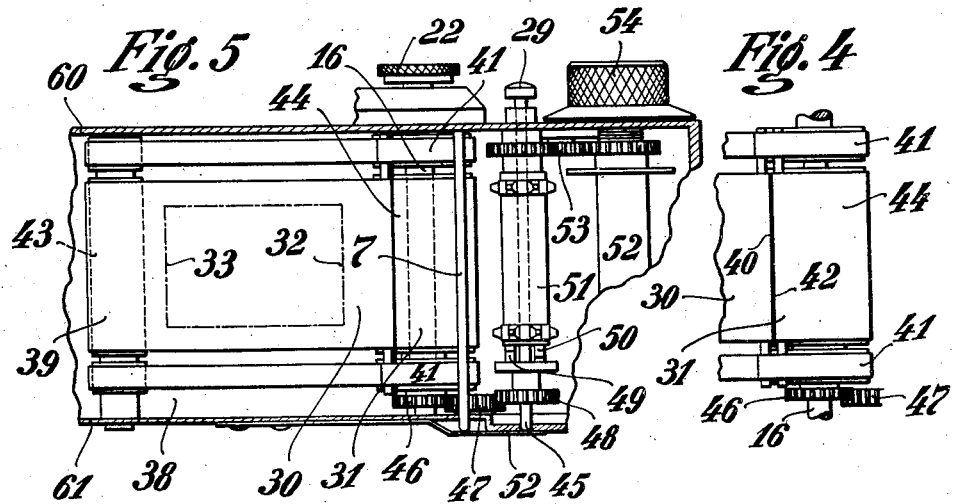
INVENTOR
*Theodor Pauschert*
BY
*Ivan E. A. Konigsberg*
ATTORNEY June 17, 1941. T. PAUSCHERT 2,245,871
FOCAL PLANE SHUTTER
Filed May 16, 1939 2 Sheets-Sheet 2
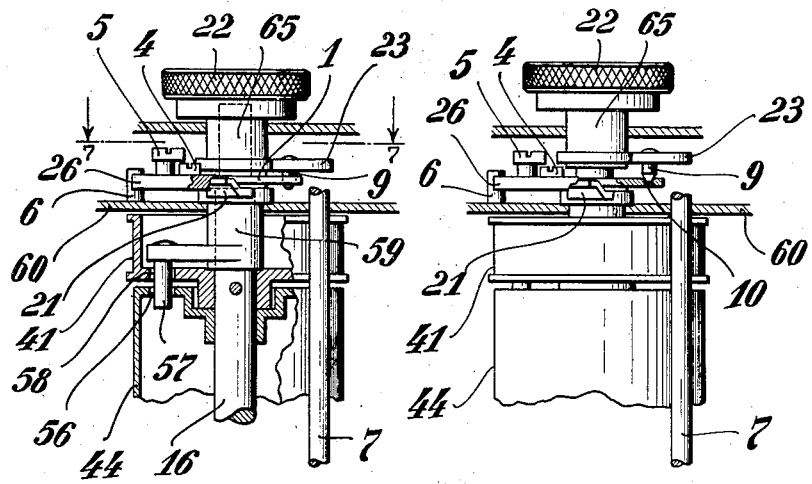
INVENTOR
Theodor Pauschert
BY
Ivan E. A. Konigsberg
ATTORNEY Patented June 17, 1941

2,245,871

UNITED STATES PATENT OFFICE 2,245,871

FOCAL PLANE SHUTTER

Theodor Pauschert, Wetzlar, Germany, assignor, by mesne assignments, to Frank Dumur, Lausanne, Switzerland Application May 16, 1939, Serial No. 273,828
In Germany June 2, 1938

2 Claims. (Cl. 95—57)

This invention relates to improvements in focal plane shutter mechanisms of the type disclosed in the U. S. Patent 2,192,500, dated March 5, 1940. The said patent and this application relate to curtain shutter mechanisms for photographic cameras in which the two shutter curtains move across the film window independently of each other. When such a shutter is rewound after an exposure the edges of the curtains overlap. It follows that, when the shutter is released, the leading curtain edge moves through a greater distance than the edge of the follow up curtain before the edges enter the film window area. Consequently the two edges have different speeds. This causes uneven exposures and also results in certain mechanical disadvantages which must be overcome and compensated for.

The object of the present invention is to provide a simplified construction whereby to obtain a braking effect upon the first curtain so that it will enter the film window area at the same speed as that of the second curtain, and whereby the disadvantages resulting from the overlapping of the edges are eliminated. The invention will be better understood from the following description read in connection with the accompanying drawings in which Fig. 1 is a curve diagram illustrating the run of the shutter curtains.

Fig. 2 is a diagrammatic view showing the positions of the curtains when the edges are overlapping.

Fig. 3 is a diagrammatic view illustrating the curtains position when the edges thereof are alined in accordance with this invention.

Fig. 4 is a fragmentary view in elevation showing the curtains as in Fig. 3.

Fig. 5 is an outline view of the camera according to this invention with parts in section and parts broken away. The view is from the rear of the camera looking towards the objective.

Fig. 6 is an enlarged detail sectional view of the curtains roller mechanism illustrating the improved construction. Parts are broken away.

Fig. 7 is a plan view of certain curtains controlling elements taken on the line 7—7 of Fig. 6.

Fig. 8 is a detail outline view of parts shown in Figs. 6 and 7.

Fig. 9 is a view similar to Fig. 6 but shows the parts in different positions.

Fig. 10 is a sectional view similar to Fig. 7 with the parts in different positions.

The diagram in Fig. 1 illustrates the movements of the shutter curtains. The leading or first curtain is marked 30, the follow up or second curtain is marked 31. The numerals 32 and 33 indicate the edges of the film window within which the exposure takes place. The movement of the leading edges across the film window is designated "distance" and the time of exposure is marked "time." The numeral 34 indicates the starting point of the first curtain and the numeral 35 that of the second curtain. It will be noted that the distance 34—32 is the length of movement of the leading edge of the first curtain to the edge of the film window and the lesser distance 35—32 is the length of movement of the leading edge of the second curtain. By leading edges or simply curtains edges are meant the edges of the curtains which form the exposure opening or slit.

The diagram illustrates the movements of the curtains edges according to this invention in which the overlapping of the edges is eliminated by means to be explained hereafter. The numeral 36 indicates the point at which the movement of the first curtain is delayed and the speed thereof decreased to an extent corresponding to the starting speed of the second curtain before the two curtains enter the film window area. At 32 the two curtains enter this area at the same speed. They have at that point the same velocity. Thus even exposure of all the portions of the exposed film is assured. Where focal plane shutter curtains move at uneven speeds within the film window uneven exposures result. The shaded area in Fig. 1 indicates the exposure opening formed by the two curtains. In the illustration it happens to indicate a curtain opening of constant width but this is merely the result of the particular exposure selected for convenient illustration. The present invention is directed to shutter curtains which are independently released and which therefore move independently of each other. The question of a constant exposure opening is not involved. For instance, when the shutter is set for time exposure the first curtain moves across the film window at its own speed so that the entire area is exposed before the second curtain starts to move. Also in this case it is desirable that the curtains edges move at the same speed to avoid uneven exposures.

Referring now to Figs. 1 to 4, the numeral 38 denotes a miniature camera of a well known type in which the first curtain 30 has its left hand edge secured to a spring roller 39 and its right hand exposure forming edge 40 connected to ribbon drums 41, 41 by ribbons as is usual. Similarly the second curtain 31 has its left hand exposure forming edge 42 connected by ribbons to the spring roller 43 and its right hand edge connected to the curtain roller 44. Figs. 2 and 5 show the leading curtain edges 40 and 42 in overlapping position when the shutter has been rewound after an exposure. Figs. 3 and 4 show the leading curtain edges 40 and 42 in the positions which they have after the overlapping has been eliminated according to this invention.

The curtain roller 44 is rotatably supported on a curtain shaft 16 which is in driving connection with the shutter release shaft 45 by gears 46, 47 and 48. The shaft 45 carries the gear 48 and has clutch members 49 in engagement with other clutch members 50 on the film transport roller 51. These clutch members are normally clutched together by a spring 52. The shaft 45 extends upwards through the roller 51 and has at the top a shutter release button 29 whereby the members 49 may be depressed and disengaged from the members 50. The release shaft 45 is in driving connection with the shutter rewinding and film advancing roller 52 by a train of gears shown at 53. The roller 52 is operated by a rewinding knob 54. Rotation of the latter actuates the roller 51 to transport the film to be wound up upon the roller 52. The ribbon drums 41 are fast on the shaft 16 and the curtain roller 44 has a driving connection with the upper drum 41 by means of a hole at 56 through which extends a pin 57 which passes through a circular slot 58 in the drum. The pin 57 is part of a nipple 59 which is loose on the shaft 16, see Fig. 6. The parts so far described, their function and operation are well known in the art.

Coming now to a description of the improvements according to this invention attention is directed to Figs. 6, 7 and 8. The nipple 59 carries at its upper end a finger 21. Slightly above the latter there is arranged a swinging pawl 26 carried by a rod 7, see Fig. 5, which also serves as a pivot for said pawl. A spring 8 keeps the free end of the pawl against a stop 6. The spring also tends to press the pawl 26 and the rod 7 downward. The rod 7 is guided in the upper and lower partitions 60 and 61 of the camera, Fig. 5. The pawl carries two eccentrically pivoted screws 4 and 5, and is formed with a tooth 3. Above the pawl and secured to the shaft 16 there is a disk 1 having a number of sockets 2. Above the disk 1 there is a nipple 65 which at its upper end carries the time setting knob 22 and at its lower end carries an arm 23 with a pin 9, Fig. 9, adapted to be seated in any one of the sockets 2.

When the shutter is wound up after an exposure the parts are in the positions shown in Figs. 6, 7 and 8, and it should be noted that at this time the pawl 26 with the screws 4 and 5 is in a higher plane than the finger 21 because the rod 7, which carries said pawl, is pushed into its normal upper position by the spring 52, see Fig. 5. The wound up shutter is as usual held in closed position by the clutch 49—50.

When an exposure is to be made, the operator depresses the shutter release 29 whereby the clutch is thrown out and at the same time the spring 8 moves the pawl 26 down into the plane of the finger 21, the latter now being engaged by the tooth 3 on the pawl as in Fig. 7. As soon as the shutter is released the spring roller 39 pulls on the first shutter curtain and moves it sufficiently to bring its leading edge 40 from the position in Fig. 2 to the position in Fig. 3 and the overlapping is now eliminated. This move-ment of the first curtain of course rotates the ribbon drums 41 and the curtains shaft 16. The slot 58 rotates with the upper drum and does not affect the pin 57. The latter is therefore free to move but cannot do so because the pawl tooth 3 prevents movement of the finger 21, it being recalled that the latter and the pin are both parts of the nipple 59.

However, the disk 1 is fast on the shaft 16 and when the latter is rotated the disk also moves and the pin 9 now moves the arm 23 so that said arm now swings around, clockwise in Fig. 7, and hits either of the screws 4 and 5 thereby moving the pawl 26 against the force of the spring 8 and moving the tooth 3 out of the path of the finger 21. The latter and the pin 57 are now free to move. The second spring roller 43 then acts upon the second curtain 31 to unwind it from and rotate the curtain roller 44 so that an exposure may be made.

The effect of the operation and function of the several parts described in connection with the release of the shutter is such that the force ordinarily necessary for rotating the shaft 16 whereby to unwind the drums 41 must in this instance also overcome the inertia of the parts such as the disk 1, the nipple 65 with the arm 23, the pawl 26 with the resistance of the spring 8 so that the movement of the first curtain is subject to a braking action so proportioned that it enters the film window area with the same speed as the later starting second curtain. This braking action is necessary in order to compensate for the greater velocity of the movement of the first curtain due to the additional distance through which it has to move because of the overlapping of the two curtain edges.

The length of exposures is regulated by the time setting knob 22. By raising the latter the pin 9 may be disengaged from one of the sockets 2 and inserted in another socket whereby to vary the angle between the arm 23 and the finger 21 as will be understood. The disk 1 may have other smaller sockets 10 which are engaged by the tapered point of the pin 9. This is of advantage for many short exposures. In that event the arm 23 strikes the screw 5. The sockets 2 and 10, and the screws 4 and 5 on the pawl 26 provide a wide range of adjustability for different exposures.

Fig. 9 shows the position of the pin 9 when it is seated in one of the smaller sockets 10. Fig. 10 shows the arm 23 engaging the screw 5 which is higher than the screw 4.

It is also to be noted that the spring 8 is merely a member for insuring that the tooth 3 on the pawl 26 is positioned in the path of the movement of the finger 21 so as to stop the latter and brake the first curtain. Other means, not shown, may be employed within the scope of this invention and the claims. It will also be understood that the weight of the pawl 26 and its carrying rod 7 may be sufficient to lower these members so as to bring the pawl down into the plane of the finger 21 when the spring 52 has been lowered by depressing the release 29. In such case the spring 8 need not act in a downward direction.

I claim:

1. In a camera having an exposure area, a shutter comprising two curtains having free edges defining the exposure opening, means for independently releasing said curtains to make an exposure, said curtains moving with accelerated motion when released, means for rewinding said curtains after an exposure, the adjacent free edges of the curtains overlapping during and after the rewinding operation and mechanism for moving one of said curtains with respect to the other to eliminate said overlapping relation after said curtains have been released whereby the said curtains edges enter the exposure area of said camera at the same speed, said mechanism comprising a curtain shaft rotatable with the movement of the first curtain, a finger movable with the second curtain, a pawl normally out of the path of the movement of said finger, means for moving said pawl, into the path of said finger to prevent the same and the second curtain from moving until the first curtain has moved a predetermined distance and an arm movable with said curtain shaft for removing said pawl from the path of movement of said finger.

2. A mechanism according to claim 1 including means operatively connected to the said curtain releasing means for maintaining said pawl in its normal position and means for regulating the operative timing relation between the said arm and the said finger whereby to time the exposure.

THEODOR PAUSCHERT.